(12) United States Patent
Cove (10) Patent No.: US 11,128,176 B2
(45) Date of Patent: Sep. 21, 2021

(54) WIRELESS ELECTRIC FIELD POWER TRANSFER SYSTEM, TRANSMITTER AND RECEIVER

(71) Applicant: Solace Power Inc., Mount Pearl (CA)

(72) Inventor: Samuel Robert Cove, Mount Pearl (CA)

(73) Assignee: SOLACE POWER INC., Mount Pearl (CA)

( * ) Notice: Subject to any disclaimer, the term of this patent is extended or adjusted under 35 U.S.C. 154(b) by 0 days.

(21) Appl. No.: 16/722,583

(22) Filed: Dec. 20, 2019

(65) Prior Publication Data

US 2020/0203997 A1 Jun. 25, 2020

Related U.S. Application Data

(60) Provisional application No. 62/783,808, filed on Dec. 21, 2018.

(51) Int. Cl.
*H02J 50/05* (2016.01)
*H02J 50/12* (2016.01)

(52) U.S. Cl.
CPC .............. *H02J 50/12* (2016.02); *H02J 50/05* (2016.02)

(58) Field of Classification Search
CPC ................................. H02J 50/05; H02J 50/12
USPC ....................................................... 307/104
See application file for complete search history.

(56) References Cited

U.S. PATENT DOCUMENTS

| 9,653,948 | B2 | 5/2017 | Polu et al. |
| 9,979,206 | B2 | 5/2018 | Nyberg et al. |
| 2014/0375251 | A1* | 12/2014 | Sakai ................... H02M 7/537 320/107 |
| 2015/0349542 | A1* | 12/2015 | Yamamoto .............. H02J 50/40 307/104 |
| 2016/0322867 | A1 | 11/2016 | Polu et al. |
| 2016/0336808 | A1 | 11/2016 | Liu et al. |
| 2017/0117751 | A1* | 4/2017 | Karnstedt ............... H02J 7/025 |
| 2018/0159359 | A1 | 6/2018 | Park et al. |
| 2019/0280529 | A1* | 9/2019 | Kawanami .............. H02J 7/025 |
| 2020/0099254 | A1 | 3/2020 | Bartlett et al. |
| 2020/0203998 | A1* | 6/2020 | Almudallal ............. H02J 50/12 |

FOREIGN PATENT DOCUMENTS

CA 2984463 A1 11/2016

OTHER PUBLICATIONS

International Search Report and Written Opinion for PCT/CA2019/051861 dated Apr. 6, 2020.

* cited by examiner

*Primary Examiner* — William Hernandez
(74) *Attorney, Agent, or Firm* — Harness, Dickey & Pierce, P.L.C.

(57) ABSTRACT

A transmit resonator is provided. The transmit resonator comprises: at least two inductors; at least one switching network electrically connected to one inductor of the at least two inductors; at least one secondary capacitive electrode electrically connected to the switching network; at least one main capacitive electrode electrically connected to one inductor of the at least two inductors; and a controller electrically connected to the switching network. The controller is configured to control the switching network to control connection of the secondary capacitive electrode to one inductor of the at least two inductors via the switching network. The inductors and electrodes are configured to resonate to generate an electric field.

20 Claims, 7 Drawing Sheets

FIG. 7

WIRELESS ELECTRIC FIELD POWER TRANSFER SYSTEM, TRANSMITTER AND RECEIVER

RELATED APPLICATION

This application claims the benefit of U.S. Provisional Application No. 62/783,808 filed on Dec. 21, 2018, the entire content of which is incorporated herein by reference.

FIELD

The subject application relates generally to wireless power transfer and in particular, to a wireless electric field power transfer system, and a transmitter and receiver therefor.

BACKGROUND

A variety of wireless power transfer systems are known. A typical wireless power transfer system includes a power source electrically connected to a wireless power transmitter, and a wireless power receiver electrically connected to a load. In magnetic induction systems, the transmitter has an induction coil that transfers electrical energy from the power source to an induction coil of the receiver. Power transfer occurs due to coupling of magnetic fields between the induction coils of the transmitter and receiver. The range of these magnetic induction systems is limited and the induction coils of the transmitter and receiver must be in optimal alignment for power transfer. There also exist resonant magnetic systems in which power is transferred due to coupling of magnetic fields between the induction coils of the transmitter and receiver. However, in resonant magnetic systems the induction coils are resonated using at least one capacitor. The range of power transfer in resonant magnetic systems is increased over that of magnetic induction systems and alignment issues are rectified. While electromagnetic energy may be produced in magnetic induction and resonant magnetic systems, the majority of power transfer occurs via the magnetic field. Little, if any, power is transferred via electric induction or resonant electric induction.

In electrical induction systems, the transmitter and receiver have capacitive electrodes. Power transfer occurs due to coupling of electric fields between the capacitive electrodes of the transmitter and receiver. Similar, to resonant magnetic systems, there exist resonant electric systems in which the capacitive electrodes of the transmitter and receiver are made resonant using at least one inductor. Resonant electric systems have an increased range of power transfer compared to that of electric induction systems and alignment issues are rectified. While electromagnetic energy may be produced in electric induction and resonant electric systems, the majority of power transfer occurs via the electric field. Little, if any, power is transferred via magnetic induction or resonant magnetic induction.

Although wireless power transfer techniques are known, improvements are desired. It is therefore an object to provide a novel wireless electric field power transfer system, a transmitter and receiver therefor and a method of wirelessly transmitting power.

SUMMARY

It should be appreciated that this Summary is provided to introduce a selection of concepts in a simplified form that are further described below in the Detailed Description of Embodiments. This Summary is not intended to be used to limit the scope of the claimed subject matter.

Accordingly, in an aspect, there is provided a transmit resonator comprising: at least two inductors; at least one switching network electrically connected to one inductor of the at least two inductors; at least one secondary capacitive electrode electrically connected to the switching network; at least one main capacitive electrode electrically connected to one inductor of the at least two inductors; and a controller electrically connected to the switching network, the controller configured to control the switching network to control connection of the secondary capacitive electrode to one inductor of the at least two inductors via the switching network, wherein the inductors and electrodes are configured to resonate to generate an electric field.

In one or more embodiments, the receive resonator comprises a plurality of controllers electrically connected to the at least one switching network. Each controller is configured to control the at least one switching network to control connection of the at least one secondary capacitive electrode to one inductor of the at least two inductors via the switching network, wherein the inductors and electrodes are configured to resonate to extract power from an electric field via resonant electric field coupling.

In one or more embodiments, each controller is configured to control a connection between a secondary capacitive electrode and an associated inductor.

In one or more embodiments, the controller is configured to control the capacitance of the transmit resonator by controlling connection of the secondary capacitive electrode to one inductor of the at least two inductors via the switching network.

In one or more embodiments, a first plurality of secondary capacitive electrodes surround one main capacitive electrode and a second plurality of secondary capacitive electrodes surround another main capacitive electrode.

In one or more embodiments, the transmit resonator has two main capacitive electrodes.

In one or more embodiments, the transmit resonator further comprises at least one detector connected to at least one inductor and the controller, the detector configured to detect impedance, wherein the controller is configured to control the switching network to control connection of the secondary capacitive electrode to the inductors based on the detected impedance.

According to another aspect there is provided a wireless power transfer system comprising the described transmit resonator.

According to another aspect, there is provided a receive resonator comprising: at least two inductors; at least one switching network electrically connected to one inductor of the at least two inductors; at least one secondary capacitive electrode electrically connected to the switching network; at least one main capacitive electrode electrically connected to one inductor of the at least two inductors; and a controller electrically connected to the switching network, the controller configured to control the switching network to control connection of the secondary capacitive electrode to one inductor of the at least two inductors via the switching network, wherein the inductors and electrodes are configured resonate to extract power from an electric field via resonant electric field coupling.

In one or more embodiments, the receive resonator comprises a plurality of controllers electrically connected to the at least one switching network. Each controller is configured to control the at least one switching network to control connection of the at least one secondary capacitive electrode to one inductor of the at least two inductors via the switching network, wherein the inductors and electrodes are configured to resonate to extract power from an electric field via resonant electric field coupling.

In one or more embodiments, each controller is configured to control a connection between a secondary capacitive electrode and an associated inductor.

In one or more embodiments, the controller is configured to control the capacitance of the transmit resonator by controlling connection of the secondary capacitive electrode to one inductor of the at least two inductors via the switching network.

In one or more embodiments, a first plurality of secondary capacitive electrodes surround one main capacitive electrode and a second plurality of secondary capacitive electrodes surround another main capacitive electrode.

In one or more embodiments, the receive resonator has two main capacitive electrodes.

In one or more embodiments, the receive resonator further comprises a detector connected to the switching network and the controller, the detector configured to detect impedance, wherein the controller is configured to control the switching network to control connection of the secondary capacitive electrode to the inductors based on the detected impedance.

According to another aspect there is provided a wireless power transfer system comprising the described receive resonator.

According to another aspect, there is provided a wireless power transfer system comprising: a transmitter comprising: a power source configured to generate a power signal; and a transmit resonator electrically connected to the power source, the transmit resonator comprising: at least two transmit inductors; at least one switching network electrically connected to one transmit inductor of the at least two transmit inductors; at least one secondary capacitive electrode electrically connected to the switching network; at least one main capacitive electrode electrically connected to one transmit inductor of the at least two transmit inductors; and a controller electrically connected to the switching network, the controller configured to control the switching network to control connection of the secondary capacitive electrode to one transmit inductor of the at least two transmit inductors via the switching network, wherein the transmit inductors and secondary and main capacitive electrodes are configured resonate to generate an electric field; and a receiver comprising: a load; and a receiver resonator electrically connected to the load, the receive resonator comprising: at least two receive inductors; and at least two receive capacitive electrodes electrically connected to the receive inductors, wherein the receive inductors and receive capacitive electrodes are configured resonate in the generated electric field and extract power via resonant electric field coupling.

In one or more embodiments, the receive resonator comprises a plurality of controllers electrically connected to the at least one switching network. Each controller is configured to control the at least one switching network to control connection of the at least one secondary capacitive electrode to one inductor of the at least two inductors via the switching network, wherein the inductors and electrodes are configured to resonate to extract power from an electric field via resonant electric field coupling.

In one or more embodiments, each controller is configured to control a connection between a secondary capacitive electrode and an associated inductor.

In one or more embodiments, the transmitter further comprises an inverter electrically connected between the power supply and the transmit resonator.

In one or more embodiments, the receiver further comprises a rectifier electrically between the load and the receive resonator.

BRIEF DESCRIPTION OF THE DRAWINGS

Embodiments will now be described more fully with reference to the accompanying drawings, in which.

DETAILED DESCRIPTION OF EMBODIMENTS

The foregoing summary, as well as the following detailed description of certain embodiments will be better understood when read in conjunction with the accompanying drawings. As will be appreciated, like reference characters are used to refer to like elements throughout the description and drawings. As used herein, an element or feature recited in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising", "having" or "including" an element or feature or a plurality of elements or features having a particular property may further include additional elements or features not having that particular property. Also, it will be appreciated that the terms "comprises", "has" and "includes" mean "including but not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to".

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, or within less than 0.01% of the stated amount.

Figure 1:
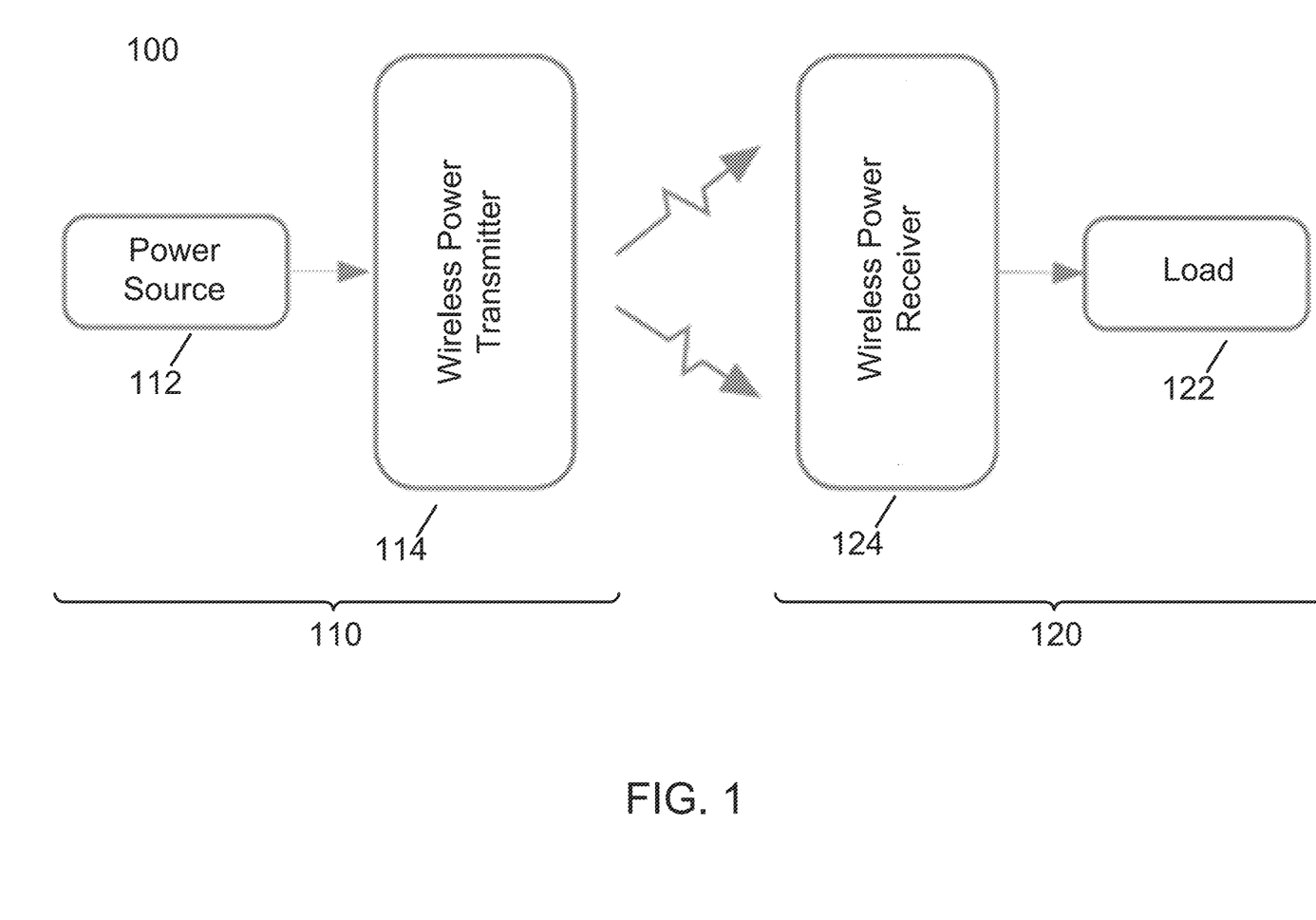
FIG. 1 is a block diagram of a wireless power transfer system.

FIG. 1 shows a wireless power transfer system generally identified by reference numeral 100. The wireless power transfer system 100 comprises a transmitter 110 comprising a power source 112 electrically connected to a transmit element 114, and a receiver 120 comprising a receive element 124 electrically connected to a load 122. Power is transferred from the power source 112 to the transmit element 114. The power is then transferred from the transmit element 114 to the receive element 124 via resonant or non-resonant electric or magnetic field coupling. The power is then transferred from the receive element 124 to the load 122.

Figure 2:
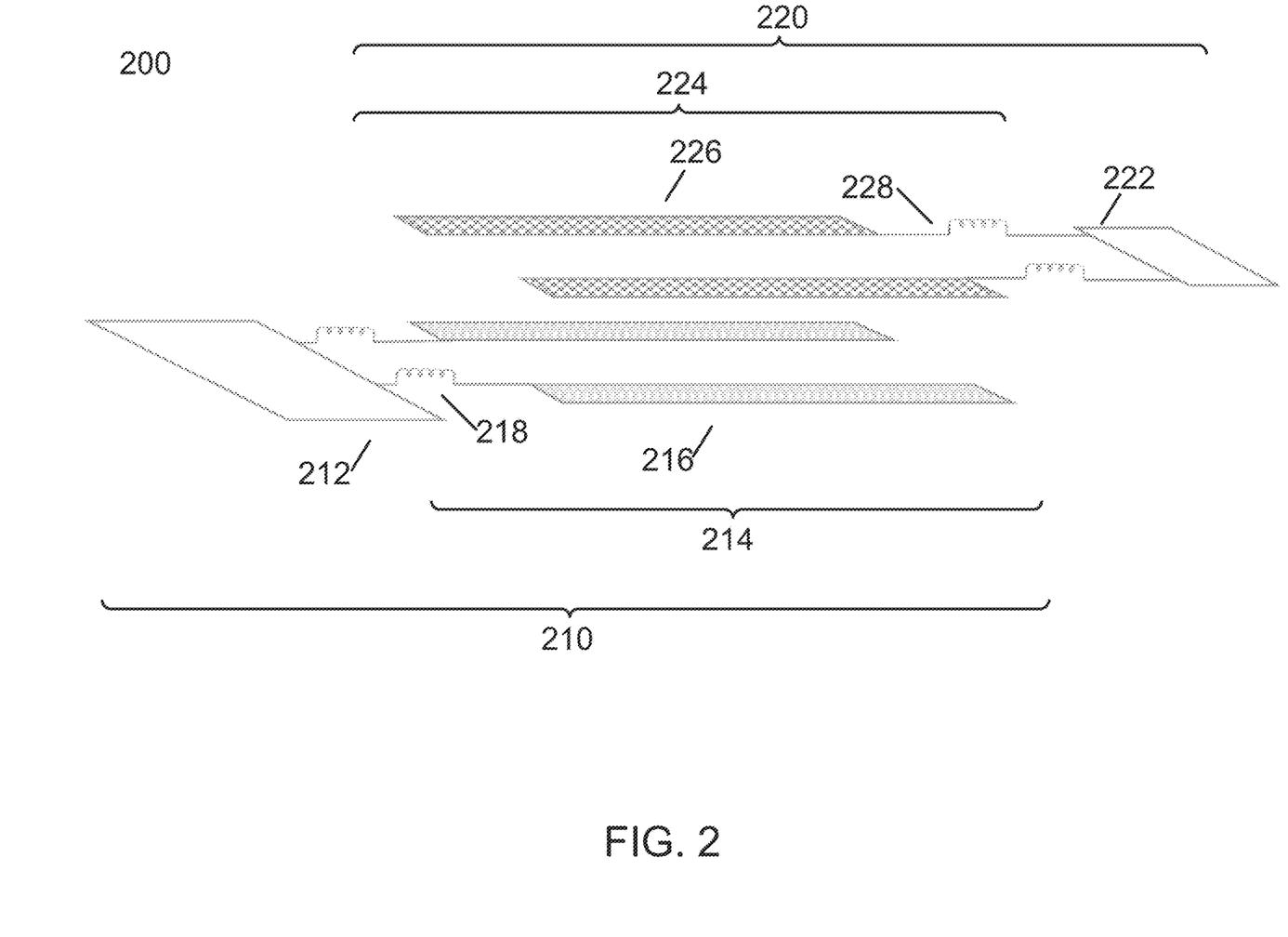
FIG. 2 is a schematic layout of a wireless resonant electric field power transfer system.

In one example embodiment, the wireless power transfer system may take the form of a resonant electric field wireless power transfer system. FIG. 2 shows a resonant electric field wireless power transfer system generally identified by reference numeral 200 such as that described in U.S. Pat. No. 9,653,948 to Polu et al. filed on Sep. 7, 2012, the relevant portions of which are incorporated herein by reference.

The resonant electric field wireless power transfer system 200 comprises a transmitter 210 comprising a power source 212 electrically connected to a transmit resonator 214. The transmit resonator 214 comprises a pair of laterally spaced, elongate transmit capacitive electrodes 216, each of which is electrically connected to the power source 212 via a high quality factor (Q) transmit inductor 218. The system 200 further comprises a receiver 220 comprising a receiver resonator 224 electrically connected to a load 222. The receive resonator 224 is tuned to the resonant frequency of the transmit resonator 214. The receive resonator 224 comprises a pair of laterally spaced, elongate receive capacitive electrodes 226, each of which is electrically connected to the load 222 via a high Q receive inductor 228.

In this embodiment, the inductors 218 and 228 are ferrite core inductors. One of skill in the art however will appreciate that other cores are possible.

In this embodiment, each transmit and receive capacitive electrode 216 and 226 comprises an elongate element formed of electrically conductive material. The transmit capacitive electrodes 216 are coplanar. The receive capacitive electrodes 226 are coplanar. In this embodiment, the transmit capacitive electrodes 216 and the receive capacitive electrodes 226 are in parallel planes. In this embodiment, the transmit capacitive electrodes 216 and the receive capacitive electrodes 226 are in the form of generally rectangular, planar plates.

While the transmit capacitive electrodes 216 and receive capacitive electrodes 226 have been described as laterally spaced, elongate electrodes, one of skill in the art will appreciate that other configurations are possible including, but not limited to, concentric, coplanar, circular, elliptical, disc, etc., electrodes. Other suitable electrode configurations are described in U.S. Pat. No. 9,979,206 to Nyberg et al. filed on Sep. 4, 2015, the relevant portions of which are incorporated herein by reference.

While the inductors 218 and 228 are shown as being connected in series to the power source 212 and the load 222, respectively, in FIG. 2, one of skill in the art will appreciate that the inductors 218 and 228 may be connected to the power source 212 and the load 222, respectively, in parallel.

During operation, power is transferred from the power source 212 to the transmit capacitive electrodes 216 via the high Q transmit inductors 218. In particular, the power signal from the power source 212 that is transmitted to the transmit capacitive electrodes 216 via the high Q transmit inductors 218 excites the transmit resonator 214 causing the transmit resonator 214 to generate an electric field. When the receiver 220, which is tuned to the same resonant frequency as the transmitter 210, is placed within the resonant electric field, the receive resonator 224 extracts power from the transmit resonator 214 via resonant electric field coupling. The extracted power is then transferred from the receive resonator 224 to the load 222. As the power transfer is highly resonant, the transmit and receive capacitive electrodes 216 and 226, respectively, need not be as close together or as well aligned as is the case with the non-resonant electric field power transfer system. While the transmit resonator 214 may generate a magnetic field, little, if any, power is transmitted via magnetic field coupling.

The inductors 218 and 228 have a fixed static inductance. In practice, inductors have actual inductance values that may vary within ±10% of their stated factory inductance values. Furthermore, the actual inductance values of the inductors 218 and 228 may change due to changes in the environment such as changes in the temperature of the operating environment. Differences in the inductance values of the inductors 218 and 228 from their required operating values may result in the wireless power transfer system 200 becoming detuned, decrease capacitive coupling between the resonators 214 and 224 and decrease system power transfer efficiency.

Figure 3:
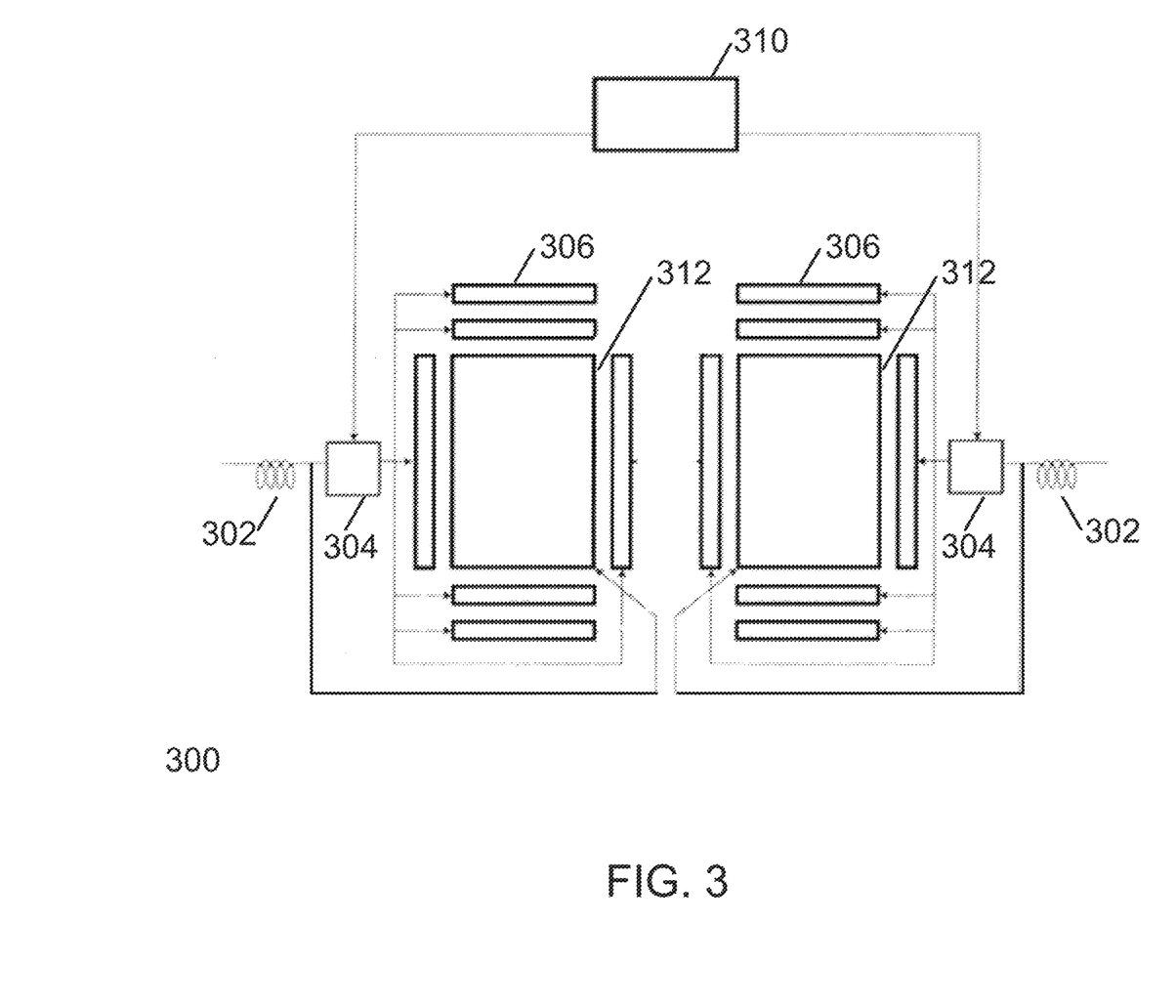
FIG. 3 is a schematic layout of a transmit resonator in accordance with an aspect of the disclosure.

To at least partially address the issues identified, a transit resonator in accordance with an aspect of the disclosure is provided. FIG. 3 shows a transmit resonator generally identified by reference numeral 300. The transmit resonator 300 is configured to generate an electric field to transfer power to one or more receive resonators as will be described. The transmit resonator 300 comprises two inductors 302, two switching networks 304, secondary capacitive electrodes 306, two main capacitive electrodes 312 and a controller 310.

The inductors 302 are configured to resonate with the secondary and main capacitive electrodes 306 and 312, respectively, at a resonant frequency to generate an electric field as will be described. Each inductor 302 is electrically connected to a single switching network 304. Each inductor 302 is electrically connected to a single main capacitive electrode 312. In this embodiment, the inductors 302 are ferrite core inductors. The inductors 302 are static inductors. One of skill in the art however will appreciate that other cores are possible. Furthermore, one of skill in the art will appreciate that more than two inductors 302 may be used.

Each switching network 304 is configured to control which secondary capacitive electrodes 306 resonate with the inductors 302 to generate an electric field. Each switching network 304 is electrically connected to a single inductor 302. Each switching network 304 is electrically connected to the controller 310. Each switching network 304 is electrically connected to six (6) secondary capacitive electrodes 306. Each switching network 304 electrically connects a single inductor 304 to the six (6) secondary capacitive electrodes 306. While two switching networks 304 have been described, one of skill in the art will appreciate, that a single switching network 304 may be used and connected to all of the secondary capacitive electrodes 306.

In this embodiment, each switching network 304 comprises a single input for an inductor 302 and six (6) outputs. Each output is electrically connected to a single secondary capacitive electrode 306. The switching networks 304 are configured to control the connection of the secondary capacitive electrodes 306 to the inductors 302. At any given time, a single secondary capacitive electrode 306 may be connected, via the switching network 304, to a single inductor 302 or no inductors 302. When a secondary capacitive electrode 306 is not connected to any of the inductors 302, the secondary capacitive electrodes 306 may become electrically floating, or grounded, depending on the requirements of the transmit resonator 300.

The controller 310 is configured to control each switching network 304 to determine which secondary capacitive electrodes 306 are connected to the inductors 302. In this embodiment, the controller 310 is electrically connected to both switching networks 304. The controller 310 is configured to send a control signal to each switching network 304. Based on the control signal, the switching network 304 to controls which secondary capacitive electrodes 306 is connected to the respective inductor 302. In this embodiment, the controller 310 is controlled by a user. The controller 310 may be remotely controlled by a user. In another embodiment, the controller 310 is configured to automatically control which secondary capacitive electrodes 306 are connected to the respective inductor 302. The controller 310 is configured to control which secondary capacitive electrodes 306 are connected to the respective inductor 302 through one or more algorithms implemented in hardware, software, one or more microprocessors and/or digital logic controllers (DLC). While a single controller 310 has been described, one of skill in the art will appreciate that multiple controllers may be used.

One main capacitive electrode 312 is electrically connected to one inductor 302 and the other main capacitive electrode 312 is electrically connected to the other inductor 302. In this embodiment, the main capacitive electrodes 312 and the secondary capacitive electrodes 306 are coplanar. In this embodiment, each main capacitive electrode 312 is a planar rectangular plate electrode. In this embodiment, the main capacitive electrodes 312 have identical dimensions.

Six (6) secondary capacitive electrodes 306 are electrically connected to one switching network 304 and the other six (6) secondary capacitive electrodes 306 are electrically connected to the other switching network 304. In this embodiment, each secondary capacitive electrode 306 is a planar rectangular plate electrode. Six (6) of the secondary capacitive electrodes 306 surround one of the main capacitive electrode 312. The other six (6) secondary capacitive electrodes 306 surround the other main capacitive electrode 312. In this embodiment, two (2) secondary capacitive electrodes 306 are above each main capacitive electrode 312, two (2) secondary capacitive electrodes 306 are below each main capacitive electrode 312, one secondary capacitive electrode 306 is to the left of each main capacitive electrode 312 and one secondary capacitive electrode 306 is to the right of each main capacitive electrode 312. In this way, the perimeter of each main capacitive electrode 306 is surrounded by secondary capacitive electrodes 306. While two sets of six (6) secondary capacitive electrodes 306 have been described, one of skill in the art will appreciate that other configurations are possible. In another embodiment, the transmit resonator 300 comprises at least one secondary capacitive electrode 306 that is electrically connected a switching network 304.

While the transmit resonator 300 has been described, one of skill in the art will appreciate that other configurations are possible. In another embodiment, the electrodes 306 and 312 have other shapes beside rectangular. In another embodiment, more or less than six (6) secondary capacitive electrodes 306 are connected to each or either switching network 304. In another embodiment, more main capacitive electrodes 312 are used. In another embodiment, only a single switching network 312 is used to electrically connect the secondary capacitive electrodes 312 to the inductors 302. In another embodiment, the controller 310 is wirelessly connected to the switching networks 304 using methods such as, but not limited to, wireless communications or data protocols including Wi-Fi™ or Bluetooth™.

Figure 4:
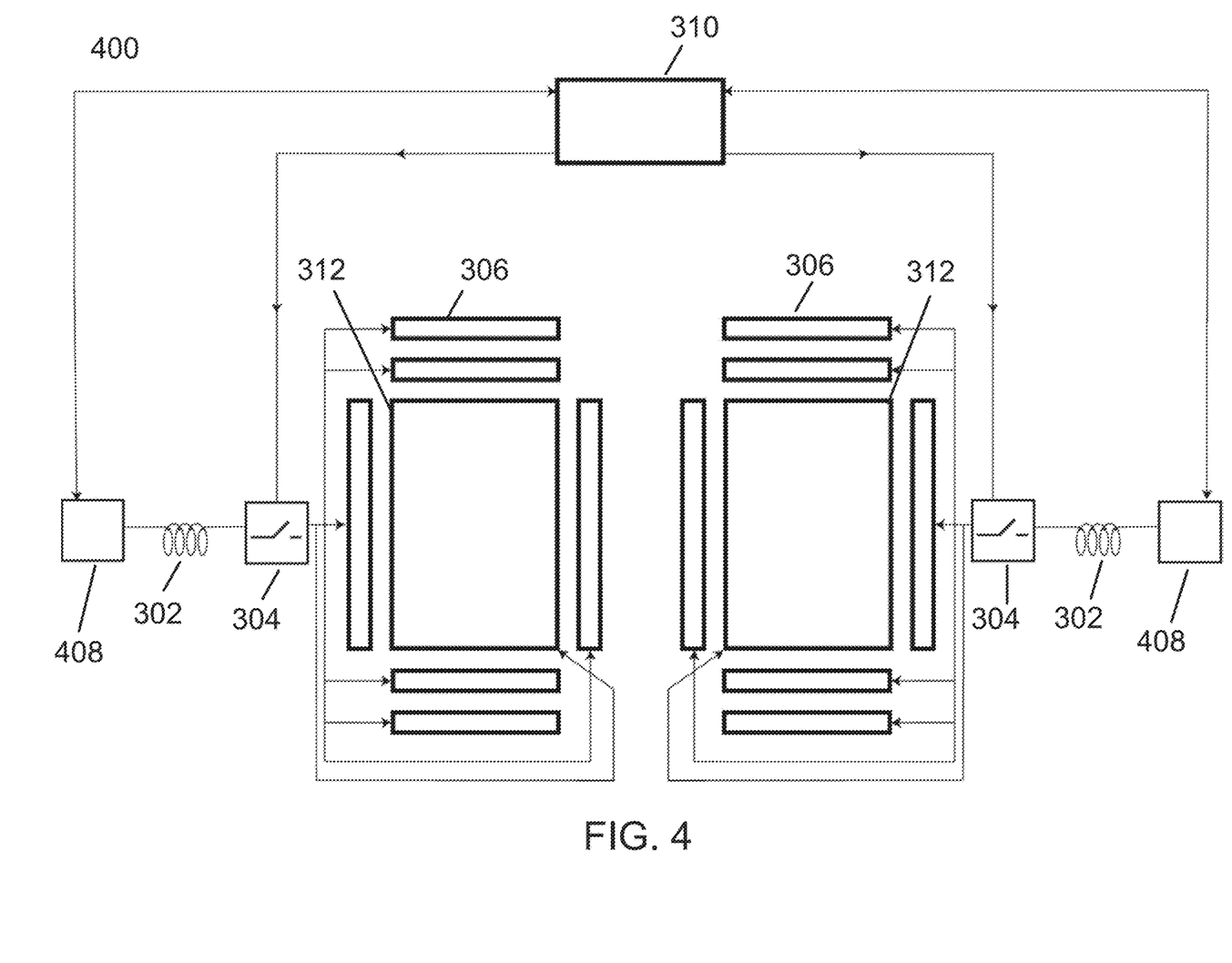
FIG. 4 is a schematic layout of another embodiment of the transmit resonator of FIG. 3.

While the transmit resonator 300 has been described, one of skill in the art will appreciate that other configurations are possible. FIG. 4 shows a transmit resonator generally identified by reference numeral 400. The transmit resonator 400 is identical to the transmit resonator 300 previously described unless otherwise stated. In this embodiment, the transmit resonator 400 further comprises two detectors 408. The detectors 408 are configured to detect impedance. Each detector 408 is electrically connected to the controller 310. Each detector 408 is electrically connected to a different inductor 302. In this embodiment, the detectors 408 are configured to detect impedances at the inductors 302. In this embodiment, each detector 408 comprises a single circuit. The single circuit is configured to measure impedance by applying a voltage and detecting a current. In this embodiment, each detector 408 further comprises a phase detector. The phase detector is configured to detect a phase. The detectors 408 determine the impedances at the inductors 302 based on the detected current and the detected phase at the inductors 302. The detected impedances are sent to the controller 310.

Figure 5:
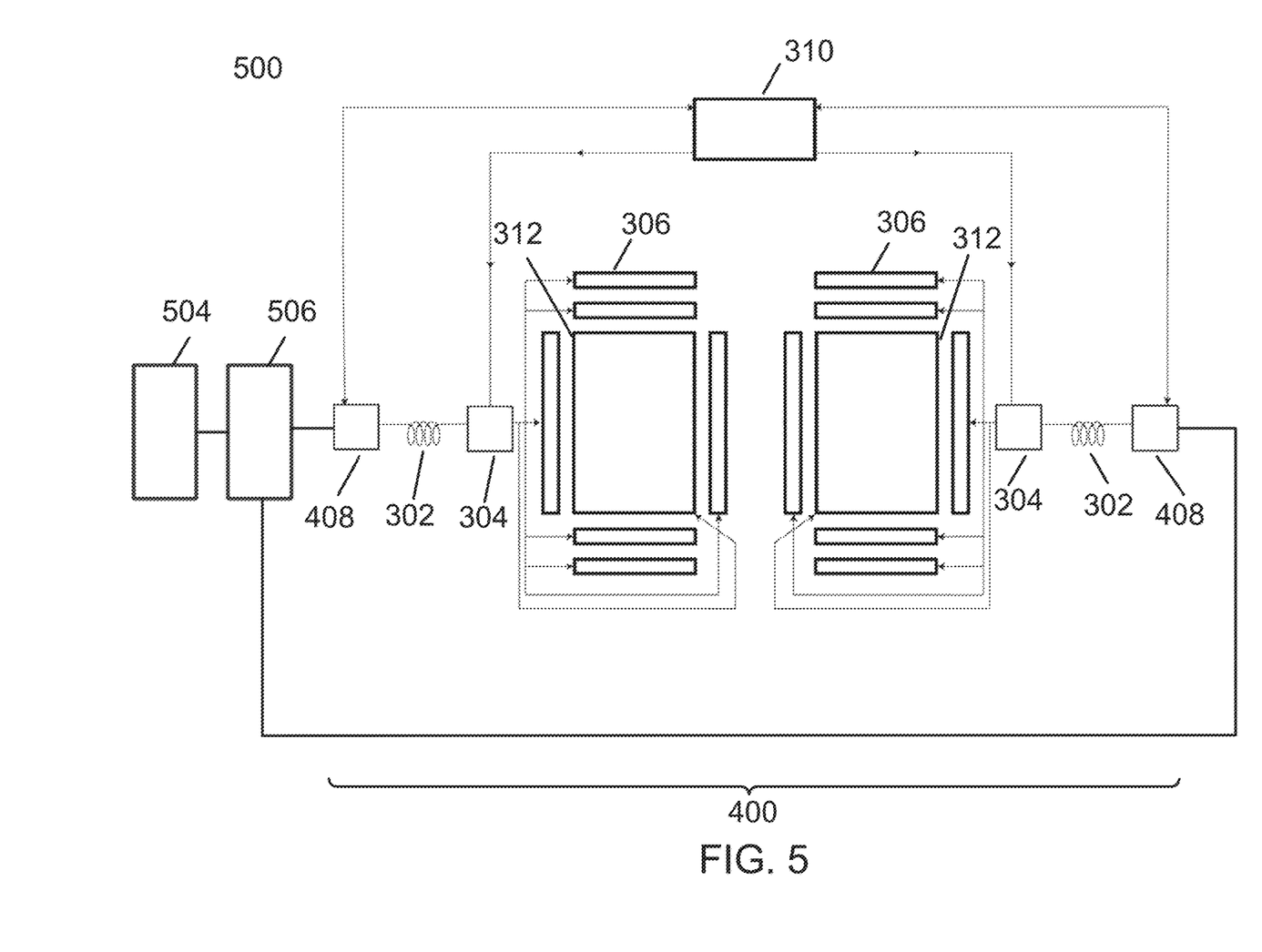
FIG. 5 is a schematic layout view of a transmitter comprising the transmit resonator of FIG. 4.

The transmit resonator 300 or 400 may be incorporated into a transmitter. FIG. 5 shows a transmitter in accordance with an aspect of the disclosure generally identified by reference numeral 500. The transmitter 500 comprises a power source 504, an inverter 506 and the transmit resonator 400. While the transmit resonator 400 has been described, one of skill in the art will appreciate that the previously described transmit resonator 300 may be substituted.

The power source 504 is configured to supply power to the inverter 506. The power source 504 is electrically connected to the inverter 506. The power source 504 supplies direct current (DC) power to the inverter 506. The inverter 506 is configured to change the DC power from the power source 504 to alternating current (AC) power. The inverter 506 is electrically connected to the power source 504. The inverter 506 is electrically connected to the detectors 408. In this embodiment, the inverter 506 comprises an impedance matching circuit. The impedance matching circuit is configured to match the output impedance of the inverter 506 to the input impedance of the transmitter 500. One of skill in the art will appreciate that the inverter 506 may operate without the use of an impedance matching circuit.

Figure 6:
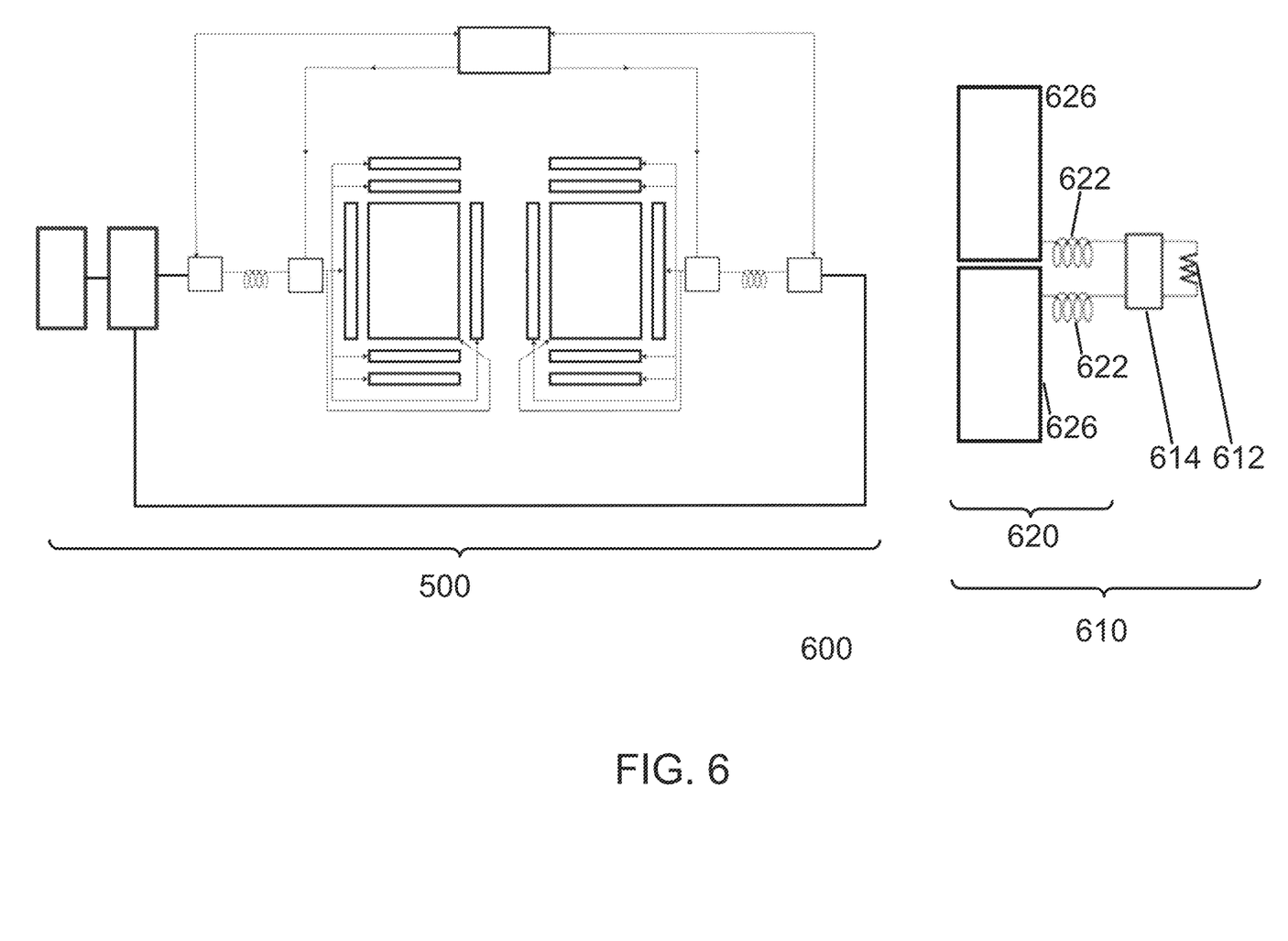
FIG. 6 is a schematic layout view of a wireless power transfer system comprising the transmitter of FIG. 5.

The transmitter 500 may be incorporated into a wireless power transfer system. FIG. 6 shows such a wireless power transfer system in accordance with an aspect of the disclosure generally identified by reference numeral 600. The system 600 comprises the transmitter 500 and a receiver 610.

The receiver 610 comprises a load 612, a rectifier 614 and a receive resonator 620. The load 612 comprises a device that requires power. For example, the load 612 comprises a battery. The load 612 is electrically connected to the rectifier 614. The rectifier 614 is configured to convert the AC power from the receive resonator 620 to DC power. The rectifier 614 is electrically connected to the load 612. The rectifier is electrically connected to the inductors 622 of the receive resonator 620.

While the receiver 610 has been described as having a rectifier 614, one of skill in the art will appreciate that in another embodiment, the receiver 610 does not comprise a rectifier. In this embodiment, the load 612 is electrically connected to the inductors 622 of the receive resonator 620.

The receive resonator 620 is configured to extract power from the electric field generated by the transmit resonator 400 via resonant electric field coupling. The receive resonator 620 comprises two receive inductors 622 and two receive capacitive electrodes 626.

The receive inductors 622 are configured to resonate with the receive capacitive electrodes 626 at the same resonant frequency as the transmit resonator 400. Each receive inductor 622 is connected to a single receive capacitive electrode 626. In this embodiment, the receive inductors 622 are ferrite core inductors. The receive inductors 622 are static inductors. One of skill in the art however will appreciate that other cores are possible.

In this embodiment, the receive capacitive electrodes 626 are coplanar. In this embodiment, each receive capacitive electrode 626 is a planar rectangular plate electrode with identical dimensions. The receive capacitive electrodes 626 are aligned such that the receive capacitive electrodes 626 may overlap with at least two capacitive electrodes 306 and 312 of the transmit resonator 400.

In operation, DC power is transferred from the power source 504 to the inverter 506. The inverter 506 converts the DC power into AC power that is transferred to the transmit resonator 400. When the receive capacitive electrodes 626 of the receive resonator 620 are presented to at least the two main capacitive electrodes 312, the detectors 408 detect impedances at the inductors 302. The detectors 408 send the detected impedances to the controller 310. The controller 310 applies logic to determine the impedance required for the transmit resonator 400 to efficiently transfer power to the receive resonator 620 at the resonant frequency. In this embodiment, the logic applied makes use of an algorithm comprising a binary search. In this embodiment, the binary search determines if the detected impedances fall within a particular range. If the impedances fall within a first range then a single secondary electrode 306 is determined to be required; if the detected impedances fall within a second range, two secondary electrodes 306 are determined to be required; and so on.

In this embodiment, the resonant frequency is 13.56 MHz. The required impedance determined by the controller 310 is a range of impedance values that allow the transmit resonator 400 to efficiently transfer power to the receive resonator 620 at the resonant frequency. The controller 310 then sends a signal to the switching networks 304 to connect the combination of secondary capacitive electrodes 306 to the associated inductors 302 and disconnect other secondary capacitive electrodes 306 from the inductors 302 to achieve an impedance value within the determined range of impedance values. The main and secondary capacitive electrodes 306 and 312, respectively, and the inductors 302 then resonate at a resonant frequency to generate an electric field.

While particular logic has been described, one of skill in the art will appreciate that other configurations are possible. In another embodiment, the logic applied makes use of a genetic algorithm in combination with a neural network. The logic is configured to assist the wireless power transfer system 600 in quickly finding receivers 610. In another embodiment, depending on the known constraints of the wireless power transfer system 600, more information regarding the possible sizes and shapes of the receive resonators 620 may result in the logic comprises one or more complex and/or time-efficient algorithm.

The controller 310 then verifies the impedances to ensure the impedances fall within the determined range of impedance values that allow the transmit resonator 400 to efficiently transfer power to the receive resonator 620 at the resonant frequency. The controller 310 sends a signal to the detectors 408 requesting the detectors 408 to detect the impedances at the inductors 302 to confirm the impedance of the transmit resonator 400. The detectors 408 respond to the controller 310 with the new impedances at the inductors 302. The controller 310 applies logic to the new impedances sent by the detectors 310 to determine if the new impedances are within the determined range of impedance values that allow the transmit resonator 400 to resonate at resonant frequency. If the new impedances are determined by the controller 310 to be within the determined range of impedance values, no changes are required.

If the new impedances are determined by the controller 310 to be outside the determined range of impedance values, the controller 310 adjusts the impedance values accordingly. The controller 310 sends signals to the switching networks 304 to connect the combination of secondary capacitive electrodes 306 to the associated inductors 302 and disconnect other secondary capacitive electrodes 306 from the inductors 302 to achieve an impedance value within the determined range of impedance values. The controller 310 then repeats the verification of the impedances to ensure the impedances fall within the determined range of impedance values that allow the transmit resonator 400 to efficiently transfer power to the receive resonator 620 at the resonant frequency. The controller 310 may repeat this process of verification and adjustment of the impedance values multiple times until the new impedance values are within the determined range of impedance values that allow the transmit resonator 400 to efficiently transfer power to the receive resonator 620 at the resonant frequency.

When the impedance values are determined to be within the determined range of impedance values that allows the transmit resonator 400 to efficiently transfer power to the receive resonator 620 at the resonant frequency, the receive resonator 620, which is tuned to the same resonant frequency, extracts power from the electric field via resonant electric field coupling. While the transmit resonator 300 may generate electromagnetic energy, the majority of power transfer occurs via the electric field. Little, if any, power is transferred via magnetic induction or resonant magnetic induction. The power received at the receive resonator 620 is converted from AC power to DC power by the rectifier 614 applied to the load 612.

As will be appreciated, the wireless power transfer system 600 described allows the capacitance of the transmit resonator 400 to be changed by controlling which secondary capacitive electrodes 306 are connected to inductors 302 which control which electrodes 306 and 312 are resonant with the inductors 302 thereby changing the capacitance of the transmit resonator 400.

While a particular transmit resonator 300 has been described, one of skill in the art will appreciate that other configurations are possible. In this embodiment, the transmit resonator 300 further comprises a passive electrode as described in U.S. patent application Ser. No. 16/138,344 filed on Sep. 21, 2018, the relevant portions of which are incorporated herein by reference. The passive electrode encompasses the electrodes 306 and 312 to at least partially eliminate environmental influences affecting the electrodes 306 and 312. The passive electrode is adjacent the electrodes 306 and 312. The passive electrode and the electrodes 306 and 312 have parallel planes. The passive electrode comprises an elongate element. The elongate element is formed of electrically conductive material. The elongate element is in the form of a generally rectangular, planar plate with opposed major surfaces.

While particular detectors 408 have been described, one of skill in the art will appreciate that other configurations are possible. In another embodiment, a single circuit is configured to apply a current and measure a voltage. In another embodiment, at least one detector 408 comprises a plurality of circuits. In another embodiment, at least one detector 408 is configured to detect the impedance differential between electrodes 306 and 312. In another embodiment, at least one detector 408 is configured to determine both the impedance presented at each electrode 306 and 312, and the impedance differential between electrodes 306 and 312.

While particular electrodes have been described, one of skill in the art will appreciate that other configurations are possible including, but not limited to, concentric, coplanar, circular, elliptical, disc, etc., electrodes. Other suitable electrode configurations are described in U.S. Pat. No. 9,979,206 to Nyberg et al. filed on Sep. 4, 2015, the relevant portions of which are incorporated herein by reference.

Figure 7:
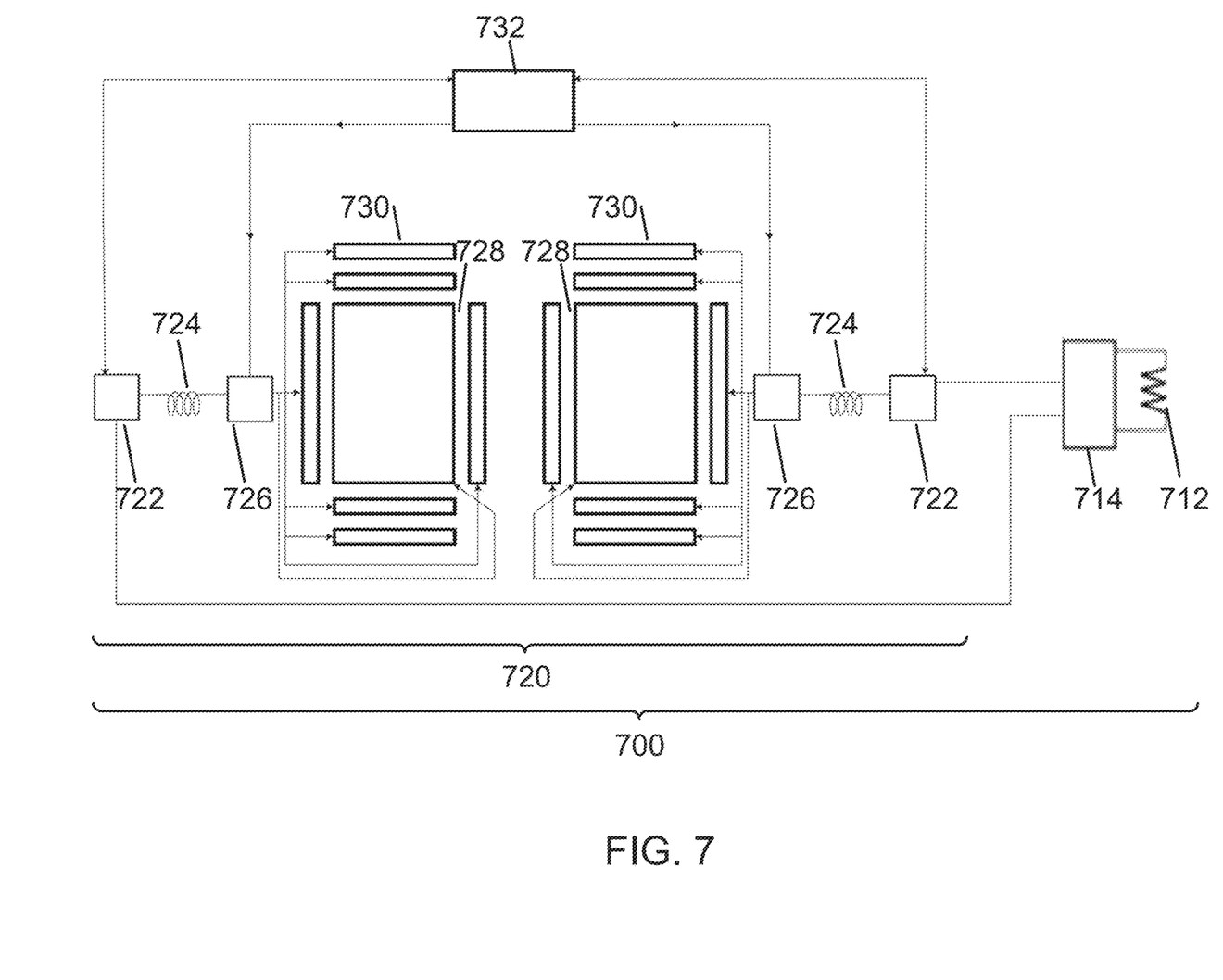
FIG. 7 is a schematic layout view of a receiver in accordance with an aspect of the disclosure.

While a particular receiver 610 has been described, one of skill in the art will appreciate that other configurations are possible. In another embodiment, the receiver 610 comprises a receive resonator with features and elements of the transmit resonator 300 previously described. FIG. 7 shows a receiver generally identified by reference numeral 700. The receiver 700 comprises a load 712, a rectifier 714 and a receive resonator 720. The load 712 and the rectifier 714 are identical to the previously described load 612 and rectifier 614, respectively, unless otherwise stated. The receive resonator 720 comprises two detectors 722, two inductors 724, two switching networks 726, two main capacitive electrodes 728, twelve secondary capacitive electrodes 730, and a controller 732.

The detectors 722 are identical to the previously described detectors 408 unless otherwise stated. The inductors 724, switching networks 726, main capacitive electrodes 728, secondary capacitive electrodes 730 and controller 732 are identical to the previously described inductors 302, switching networks 304, main capacitive electrodes 312, secondary capacitive electrodes 306 and controller 310, respectively, unless otherwise stated. The electrodes 728 and 730, and the inductors 724 are configured to resonate at a resonant frequency to extract power from a generated electric field via resonant electric field coupling.

The connections of the secondary capacitive electrodes to the inductors of the transmit resonator 300 and 400, and the receive resonator 720 may be set during resonator production to set a static optimal capacitance. Alternatively, the connections of the secondary capacitive electrodes to the inductors of the transmit resonator 300 and 400, and the receive resonator 720 may be determined during wireless power transfer.

Although embodiments have been described above and are shown in the accompanying drawings, it will be appreciated by one of skill in the art that variations and modifications may be made without departing from the scope as defined by the appended claims, and the scope of the claims should be given the broadest interpretation consistent with the specification as a whole.

What is claimed is:

1. A transmit resonator comprising:
   at least two inductors;
   at least one switching network electrically connected to one inductor of the at least two inductors;
   at least one secondary capacitive electrode electrically connected to the switching network;
   at least one main capacitive electrode electrically connected to one inductor of the at least two inductors; and
   a controller electrically connected to the switching network, the controller configured to control the switching network to control connection of the secondary capacitive electrode to one inductor of the at least two inductors via the switching network, wherein the inductors and electrodes are configured to resonate to generate an electric field.

2. The transmit resonator of claim 1, wherein the inductors and electrodes are configured to resonate to generate the electric field to transfer power via electric field coupling.

3. The transmit resonator of claim 1, wherein the controller is configured to control the capacitance of the transmit resonator by controlling connection of the at least one secondary capacitive electrode to one inductor of the at least two inductors via the switching network.

4. The transmit resonator of claim 1, wherein a first plurality of secondary capacitive electrodes surround one main capacitive electrode and a second plurality of secondary capacitive electrodes surround another main capacitive electrode.

5. The transmit resonator of claim 1, having two main capacitive electrodes.

6. The transmit resonator of claim 1, further comprising at least one detector connected to at least one inductor and the controller, the detector configured to detect impedance, wherein the controller is configured to control the switching network to control connection of the at least one secondary capacitive electrode to the inductors based on the detected impedance.

7. A wireless power transfer system comprising the transmit resonator of claim 1.

8. A receive resonator comprising:
at least two inductors;
at least one switching network electrically connected to one inductor of the at least two inductors;
at least one secondary capacitive electrode electrically connected to the at least one switching network;
at least one main capacitive electrode electrically connected to one inductor of the at least two inductors; and
a controller electrically connected to the at least one switching network, the controller configured to control the at least one switching network to control connection of the at least one secondary capacitive electrode to one inductor of the at least two inductors via the switching network, wherein the inductors and electrodes are configured to resonate to extract power from an electric field via resonant electric field coupling.

9. The receive resonator of claim 8, wherein the controller is configured to control the capacitance of the receive resonator by controlling connection of the at least one secondary capacitive electrode to one inductor of the at least two inductors via the switching network.

10. The receive resonator of claim 8, wherein a first plurality of secondary capacitive electrodes surround one main capacitive electrode and a second plurality of secondary capacitive electrodes surround another main capacitive electrode.

11. The receive resonator of claim 8, having two main capacitive electrodes.

12. The receive resonator of claim 8, further comprising at least one detector connected to the at least one switching network and the controller, the detector configured to detect impedance, wherein the controller is configured to control the switching network to control connection of the at least one secondary capacitive electrode to the inductors based on the detected impedance.

13. A wireless power transfer system comprising the receive resonator of claim 8.

14. A wireless power transfer system comprising:
a transmitter comprising:
a power source configured to generate a power signal; and
a transmit resonator electrically connected to the power source, the transmit resonator comprising:
at least two transmit inductors;
at least one switching network electrically connected to one transmit inductor of the at least two transmit inductors;
at least one secondary capacitive electrode electrically connected to the switching network;
at least one main capacitive electrode electrically connected to one transmit inductor of the at least two transmit inductors; and
at least one controller electrically connected to the switching network, the controller configured to control the switching network to control connection of the at least one secondary capacitive electrode to one transmit inductor of the at least two transmit inductors via the switching network, wherein the transmit inductors and secondary and main capacitive electrodes are configured to resonate to generate an electric field; and
a receiver comprising:
a load; and
a receiver resonator electrically connected to the load, the receive resonator comprising:
at least two receive inductors; and
at least two receive capacitive electrodes electrically connected to the receive inductors, wherein the receive inductors and receive capacitive electrodes are configured to resonate in the generated electric field and extract power via resonant electric field coupling.

15. The wireless power transfer system of claim 14, wherein the transmitter further comprises an inverter electrically connected between the power source and the transmit resonator.

16. The wireless power transfer system of claim 14, wherein the receiver further comprises a rectifier electrically between the load and the receive resonator.

17. A method of operating a resonator, the method comprising:
detecting an impedance at an inductor of the resonator;
connecting at least one secondary capacitive electrode to the inductor based on the detected impedance; and
resonating the inductor, at least one main capacitive electrode and the secondary capacitive electrode at a resonant frequency to generate an electric field to transfer power via electric field coupling.

18. The method of claim 17, wherein connecting comprises controlling a switching network to connect the secondary capacitive electrode to the inductor.

19. The method of claim 17, further comprising:
after connecting the secondary capacitive electrode to the inductor, verifying the impedance at the inductor.

20. The method of claim 19, wherein verifying the impedance comprises detecting another impedance at the inductor; and determining if the other impedance is within a range of impedances.

* * * * *